United States Patent [19]

Harkrader et al.

[11] Patent Number: 5,070,957
[45] Date of Patent: Dec. 10, 1991

[54] VARIABLE EFFORT AUTOMOTIVE POWER STEERING GEAR

[75] Inventors: Ronald L. Harkrader, Bay City; Stephen J. Reider, Saginaw, both of Mich.

[73] Assignee: General Motors Corporation, Detroit, Mich.

[21] Appl. No.: 616,145

[22] Filed: Nov. 20, 1990

[51] Int. Cl.⁵ ............................................. B62D 5/083
[52] U.S. Cl. .................................. 180/141; 180/149; 74/388 PS; 91/375 R; 137/625.24
[58] Field of Search ............... 180/132, 141, 143, 148, 180/149; 91/375 A; 137/625.21, 625.22, 625.23, 625.24; 74/388 PS

[56] References Cited

U.S. PATENT DOCUMENTS

| | | | |
|---|---|---|---|
| 2,939,429 | 6/1960 | Charlson | 121/41 |
| 3,998,131 | 12/1976 | Adams | 91/372 |
| 4,034,825 | 7/1977 | Adams | 180/143 |
| 4,759,420 | 7/1988 | Schipper et al. | 180/143 |
| 4,809,806 | 3/1989 | Pietrzak et al. | 180/148 |
| 5,016,723 | 5/1991 | Sano | 180/143 |

*Primary Examiner*—Charles A. Marmor
*Assistant Examiner*—Mitchell Bompey
*Attorney, Agent, or Firm*—Saul Schwartz

[57] ABSTRACT

A variable effort automotive power steering gear including an input or stub shaft, an output shaft or pinion head, a torsion bar between the stub shaft and pinion head defining an open-center position of one relative to the other, and detent reaction apparatus between the stub shaft and pinion head. The detent reaction apparatus includes a radial socket in a cylindrical wall of the pinion head, a detent groove in a stem of the stub shaft in the cylindrical wall, an insert rotatably supported in the radial socket with an eccentric bore offset from the centerline of the radial socket, and a detent element slidably supported in the eccentric bore in the insert and having a spherical end adapted to seat in the detent groove. The spherical end of the detent element is centered in the detent groove by rotating the insert until the detent element is at an innermost radial position. The adjusted position of the insert is captured by an in-situ injection molded plastic retainer on the pinion head in a wide annular groove in an outside diameter of the cylindrical wall which engages an exposed cavity on the insert. The retainer has a pair of annular end walls facing in spaced relationship a pair of annular shoulders on the pinion head which form the sides of the wide annular groove. The annular shoulders and annular end walls cooperate in defining a pair of seal ring grooves on the pinion head.

7 Claims, 3 Drawing Sheets

VARIABLE EFFORT AUTOMOTIVE POWER STEERING GEAR

FIELD OF THE INVENTION

This invention relates to variable effort power steering gears for automobiles.

BACKGROUND OF THE INVENTION

U.S. Pat. No. 4,759,240, issued 26 Jul. 1988 to Schipper et al and assigned to the assignee of this invention, describes a detent reaction variable effort power steering gear for automobiles including an input or stub shaft, an output shaft or pinion head, and a torsion bar therebetween defining an open-center position of one relative to the other. A plurality of radial sockets in the pinion head receive screw-in inserts having eccentric bores. Spherical detent elements are slidably received in the eccentric bores and cooperate with detent grooves in the stub shaft to simulate additional torsion bar restoring force when fluid pressure is introduced into the eccentric bores above the detent elements. To center the detent elements in the detent grooves in the open-center position of the pinion head and stub shaft, the inserts are rotated relative to the pinion head to move the spherical ends of the detent elements relative to the detent grooves. When the detent elements are exactly centered, the inserts are staked for permanent retention. The apparatus and method according to this invention affords improved adjustment and retention of the inserts.

SUMMARY OF THE INVENTION

This invention is a new and improved detent reaction variable effort automotive power steering gear including an output shaft or pinion head having a tubular extension and an input or stub shaft having a stem in and concentric with the tubular extension of the pinion head. A pair of annular shoulders on the pinion head define therebetween a wide annular groove. A plurality of radial sockets in the tubular extension of the pinion head open into the wide groove and are connected by a narrow annular center groove in the bottom of the wide groove. A plurality of longitudinal detent grooves in the stem are aligned with the radial sockets. Each radial socket rotatably supports an insert having an eccentric bore therein. Each eccentric bore slidably supports a detent element having a spherical end seated in one of the detent grooves. The inserts are rotated in the sockets to center the detent elements in the detent grooves. After the detent elements are centered, a plastic retainer is in-situ injection molded, i.e. molded in place, on the pinion head in the wide annular groove. The plastic retainer includes a pair of annular end walls facing the annular shoulders on the pinion head and cooperating therewith in defining a pair of longitudinally spaced seal ring grooves on the pinion head. An outside surface of the retainer has a shallow groove for a detent pressure chamber between the seal ring grooves. Each insert is mechanically interlocked with the plastic retainer for permanent retention of the angularly adjusted positions of the inserts. An integral radial flange of the plastic retainer in the annular center groove of the pinion head maintains the retainer centered between the annular shoulders on the pinion head.

DESCRIPTION OF A PREFERRED EMBODIMENT

Figure 1:
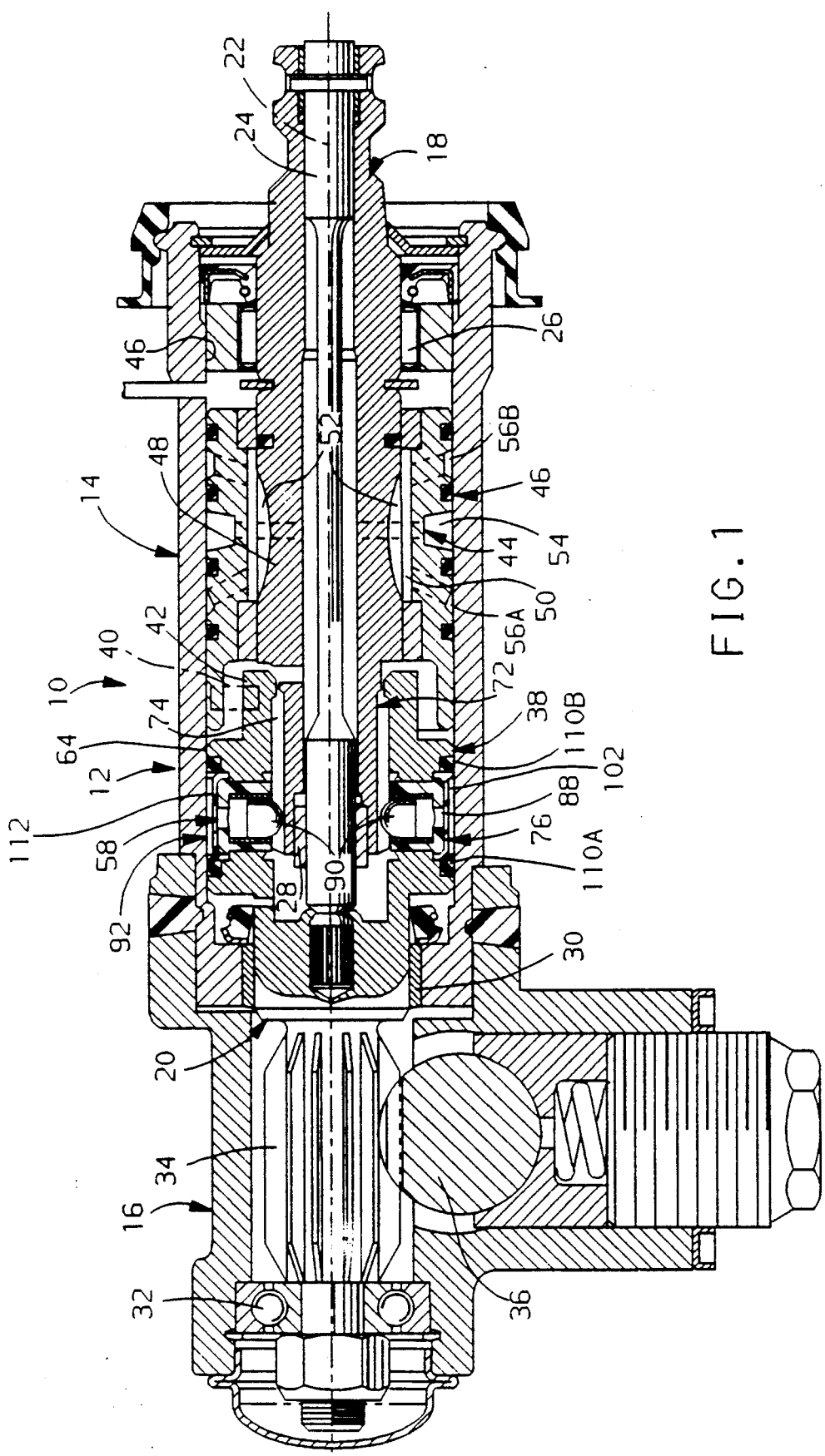
FIG. 1 is a longitudinal sectional view of a variable effort automotive power steering gear according to this invention.
Figure 2:
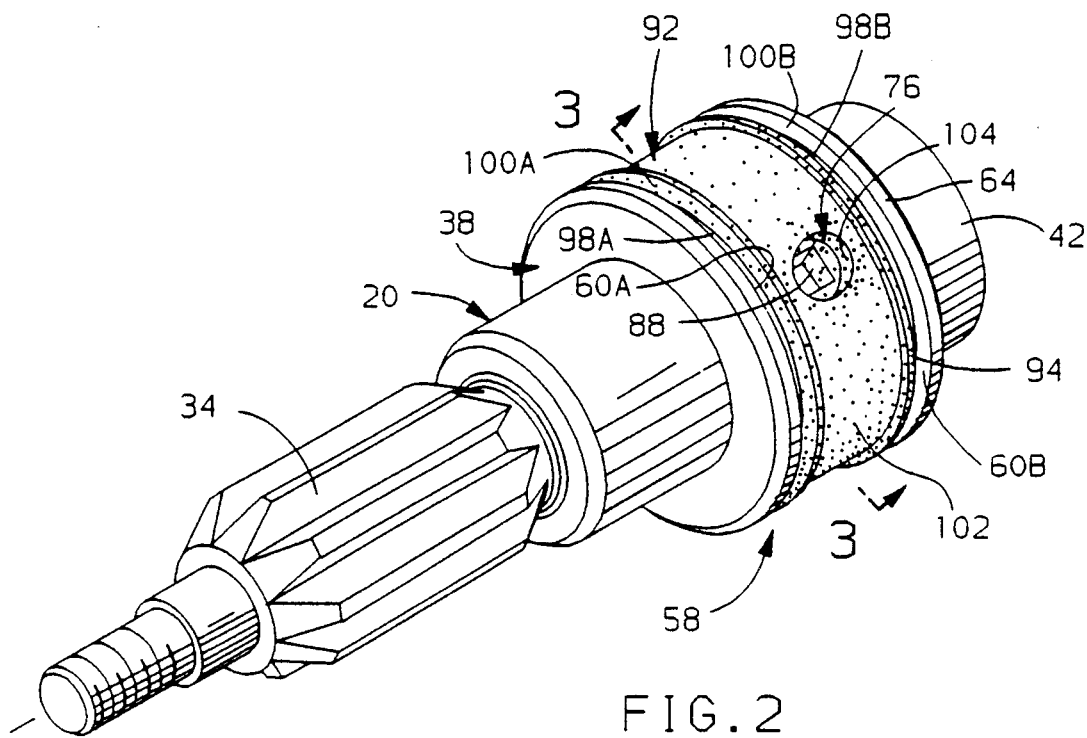
FIG. 2 is a fragmentary perspective view of a portion of FIG. 1.

Referring to FIG. 1, a detent reaction variable effort automotive power steering gear 10 according to this invention includes a composite housing 12 consisting of a cylindrical valve housing 14 and a rack and pinion housing 16. The steering gear 10 further includes a tubular input or stub shaft 18 adapted for connection to an automobile steering wheel and an output shaft or pinion head 20. The pinion head and stub shaft are aligned on a centerline 22 of the housing 12. A conventional torsion bar 24 in the stub shaft is connected at one end to the pinion head and at the other end to the stub shaft and defines an open-center position of the stub shaft relative to the pinion head, or vice versa, in the usual fashion.

The stub shaft is supported on the valve housing 14 for rotation about the centerline 22 by a needle bearing 26 and by a sleeve bearing 28 between the stub shaft and the torsion bar. The pinion head 20 is supported on the rack and pinion housing 16 for rotation about the centerline 22 by a sleeve bearing 30 and by a ball bearing 32 at the end of the pinion head. A pinion gear 34 on the pinion head 20 meshes with rack teeth on a steering rack 36 slidably supported on the rack and pinion housing 16 and adapted for connection to steered wheels of a vehicle. Rotation of the pinion head 20 about the centerline 22 is accompanied by bodily movement of the steering rack 36 in the usual fashion.

The pinion head 20 has a tubular extension 38 to the right of the pinion gear 34, FIG. 1, aligned on the centerline 22. A schematically illustrated pin 40 on a reduced diameter part 42 of the tubular extension projects radially out into a hole in a valve sleeve 44 of an open-center rotary control valve 46 of the steering gear 10 so that the valve sleeve rotates as a unit with the pinion head. The rotary control valve is generally as described in U.S. Pat. No. 3,022,772, issued to Zeigler et al and assigned to the assignee of this invention, and further includes a valve spool 48 defined by the portion of the stub shaft inside the valve sleeve 44. A plurality of grooves 50 in the valve sleeve face and cooperate with a plurality of slots 52 in the valve spool to distribute pressurized hydraulic oil from a center groove 54 on the sleeve 44 to one of a pair of side grooves 56A-B on the sleeve when there is relative rotation between the valve spool and the valve sleeve. The center groove 44 is connected to a pump, not shown, and the side grooves are connected to opposite sides of a steering assist fluid motor, not shown.

In conventional fashion, in the open-center position of the stub shaft relative to the pinion head, the rotary valve is open-center and fluid circulates at low pressure from the pump to a reservoir, not shown. When a driver turns a steering wheel connected to the stub shaft 18, the stub shaft and valve spool rotate relative to the pinion head and valve sleeve against a restoring force developed by the torsion bar which the driver senses as road feel. Relative rotation between the valve sleeve and valve spool distributes pressurized hydraulic oil to the steering assist fluid motor as described. A detent reaction apparatus 58 is disposed between the stub shaft and pinion head to simulate additional restoring force and thereby afford the driver additional road feel.

Figure 3:
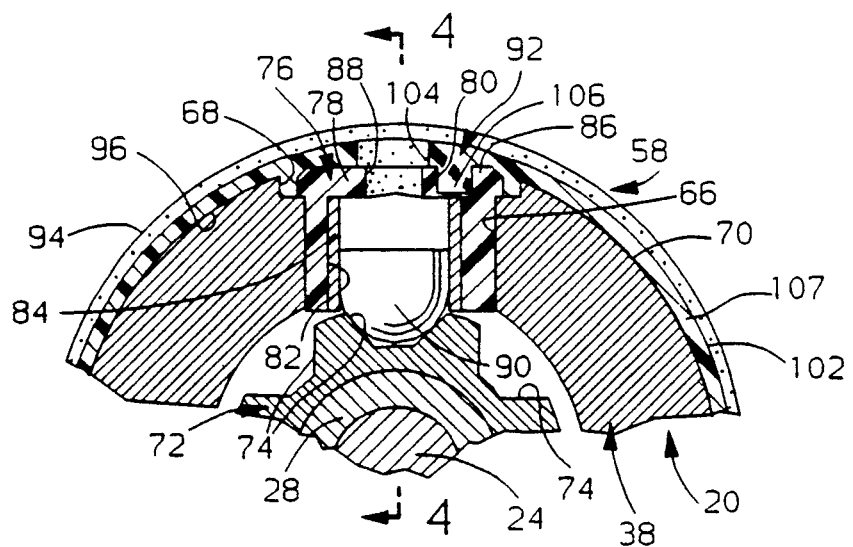
FIG. 3 is an enlarged sectional view taken generally along the plane indicated by lines 3—3 in FIG. 2.
Figure 4:
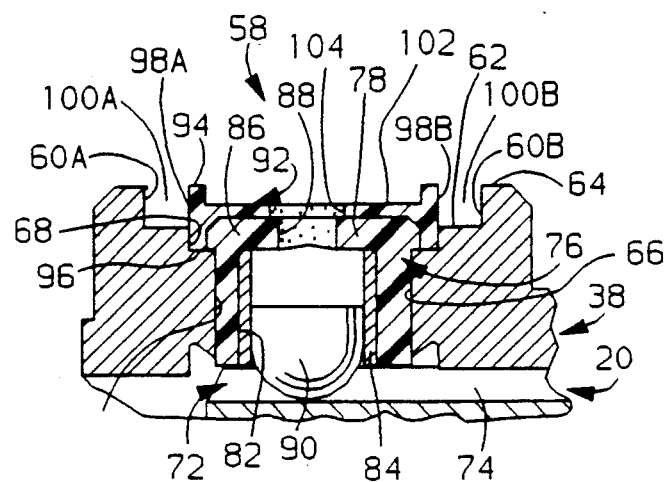
FIG. 4 is a sectional view taken generally along the plane indicated by lines 4—4 in FIG. 3.
Figure 5:
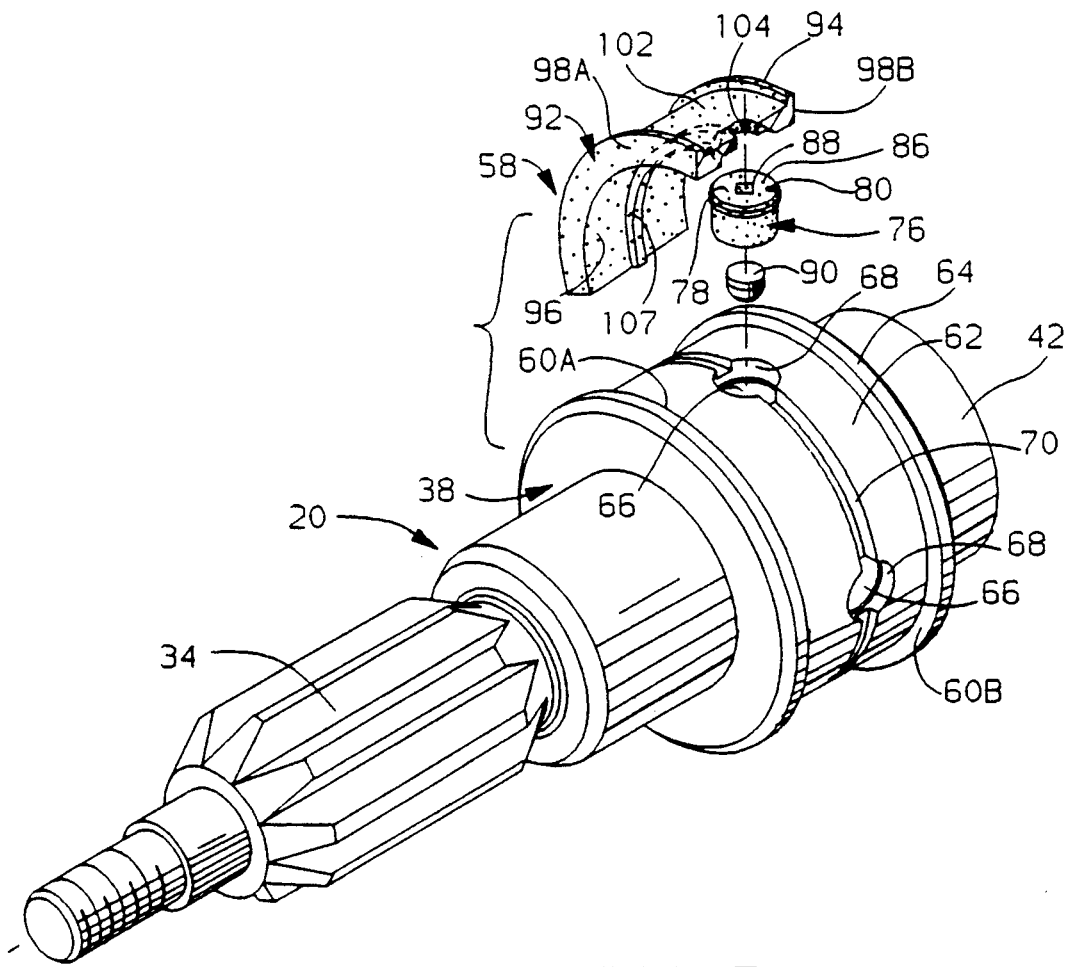
FIG. 5 is similar to FIG. 2 but showing the detent reaction apparatus of the variable effort steering gear according to this invention in exploded perspective view.

The detent reaction apparatus 58 includes a pair of annular shoulders 60A-B, FIGS. 4-5, on the pinion head in parallel planes perpendicular to the centerline 22 which shoulders define therebetween a wide annular groove 62 on an outside diameter 64 of the pinion head tubular extension 38. A plurality of cylindrical radial sockets 66 are formed in the tubular extension 38 in a common plane perpendicular to the centerline 22 and about mid-way between the annular shoulders 60A-B. Each socket has a counterbore 68, FIGS. 3-5, at one end opening into the wide groove 62. In addition, an annular center groove 70, FIGS. 3 and 5, in pinion head 20 in the middle of the wide groove 62 intersects each of the counterbores 68. The center groove 70 is in a plane parallel to the planes of the annular shoulders 60A-B.

The inboard end of the stub shaft 18 within the tubular extension 38 of the pinion head defines a stem 72 having thereon a plurality of angularly spaced, longitudinal detent grooves 74, FIGS. 1, 3 and 4. The detent grooves are V-shaped and nominally register with respective ones of the radial sockets 66. A plurality of loosely mating spline teeth and grooves, not shown, on the tubular extension 38 and on the stem 72 define a positive driving connection between the stub shaft and pinion head at a predetermined maximum angular interval of relative rotation between the stub shaft and the pinion head.

A plurality of plastic inserts 76 are rotatably supported in the radial sockets 66. Each insert has a head 78 with an annular shoulder which seats on the bottom of the corresponding counterbore 68 and a mechanical interlock means in the form of a cavity 80 which opens toward the wide groove 62. Each insert also has a cylindrical bore 82, FIGS. 3-4, the centerline of which is eccentric or offset relative to the centerline of the corresponding radial socket 66. Each eccentric bore 82 is lined with a steel sleeve 84 and is open at one end toward the stem 72 and closed at the other end by the head 86 except for a detent pressure port 88 generally in the center of the head. The detent pressure port 88 is square, FIGS. 3 and 5, for reception of an appropriate tool for rotating the inserts 76 in the radial sockets 66. The ports 88 may have any non-circular shape or they may be round and the heads 86 of the inserts may be formed to be gripped by a tool for rotating the inserts.

A plurality of bullet-shaped detent elements 90 are slidably supported in respective ones of the steel sleeves 84. The fit between the detent elements and the sleeves is close so that fluid seals are defined at the sliding interfaces therebetween. The diameter of the spherical end of each detent element is coordinated with the dimensions of the V-shaped detent grooves 74 such that the spherical ends engage the converging sides of the detent grooves in point contact before engaging the bottoms of the grooves.

When the stub shaft 18 is in its open-center position relative to the pinion head 20, the detent elements 90 must likewise be centered in the detent grooves 74. Manufacturing tolerances, however, usually necessitate adjustment of the inserts 76 after the torsion bar 24 establishes the open-center position of the stub shaft relative to the pinion head. The detent elements are centered by rotating the inserts in the radial sockets 66 until the detent elements achieve innermost radial positions in the sleeves 84. For example, a combination depth sensing and turning apparatus, not shown, may be inserted in the detent pressure ports 88 of the inserts to grip the square sides of the ports and turn the inserts while at the same time monitoring the radial positions of the detent elements until a lowest position is achieved. The sliding fit between the radial sockets 66 and the inserts 76 is tight enough that the inserts hold their angularly adjusted positions until permanently captured as described below.

After the detent elements are centered in the detent grooves, the pinion head 20 is placed in a mold of a plastic injection molding apparatus, not shown, for in-situ or in-place injection molding thereon of a plastic retainer 92 which permanently captures the adjusted positions of the inserts 76 and which prevents radial dislodgment of the inserts from the pinion head. It is contemplated that the depth sensing and turning apparatus suggested above could be incorporated in the plastic molding apparatus for manufacturing economy.

As seen best in FIGS. 2-5, the plastic retainer 92 is a cylindrical plastic ring having an outside surface 94, an inside surface 96, and a pair of annular end walls 98A-B facing corresponding ones of the annular shoulders 60A-B on the pinion head. The end walls 98A-B cooperate with the annular shoulders 60A-B in defining therebetween a pair of longitudinally spaced seal ring ring grooves 100A-B on the pinion head. The diameter of the outside surface 94 of the retainer 92 is generally the same as the diameter 64 of the pinion head and the outside surface 94 is relieved to define therein an annular shallow groove 102 for a detent pressure chamber.

The plastic retainer is molded into each of the counterbores 68 and completely around the heads 78 of the inserts 76 except outboard of the detent pressure ports 88 in the latter. During the molding operation, for example, mandrels extending radially into the counterbores 68 may cover the detent pressure ports 88 to prevent migration of plastic into the inserts 76. When the mandrels are withdrawn after the plastic cures, a plurality of holes 104 are defined in the retainer outboard of respective ones of the detent pressure ports 88 in the inserts.

When the plastic cures after in-situ molding, the inserts are mechanically interlocked with the retainer 92 by a plurality of plastic keys 107, FIG. 3, integral with the retainer and projecting into respective ones of the cavities 80. The keys 106 permanently capture the angular adjusted positions of the inserts relative to the retainer 92. In addition, because the retainer 92 completely encircles the pinion head 20, the retainer prevents radial dislodgment of the inserts from the pinion head. Further, natural shrinkage of the retainer 92 after molding squeezes the inner surface 96 against the bottom of the annular groove 62 so that a fluid seal is defined between the inner cylindrical surface 96 of the retainer 92 and the bottom of the groove 62 around the detent pressure ports 88.

During in-situ molding of the retainer 92, plastic also migrates into the annular center groove 70 in the pinion head. After the plastic cures, an integral inner radial flange 107, FIGS. 3 and 5, on the inside surface 96 is closely received in the annular center groove 70. The radial flange 107 cooperates with the center groove 70 in maintaining the retainer 92 centered between the annular shoulders 60A-B on the pinion head.

As seen best in FIG. 1, with the stub shaft 18 and pinion head 20 assembled in the housing 12, respective ones of a pair of seal rings 110A-B are disposed in the annular seal ring grooves 100A-B. The seal rings bear against the inside of the valve housing 14 and cooperate with the latter and with the shallow groove 102 on the outside surface 94 of the retainer 92 in defining an annular detent pressure chamber 112 around the pinion head. Fluid pressure in the detent pressure chamber is applied against the flat ends of the detent elements 90 through the holes 104 in the retainer and through the detent pressure ports 88 in the inserts 76. As detent pressure increases, the spherical ends of the detent elements are more forcefully pressed into the detent grooves 74. If detent pressure increases with increasing speed, the forces exerted by the detent elements 90 simulate additional torsion bar restoring force which a driver, gripping a steering wheel connected to the stub shaft 18, senses as additional road feel at higher speed.

The cooperation of the end walls 60A-B with the annular shoulders 98A-B in defining the seal ring grooves 100A-B is an important feature of this invention. That is, by using portions of the plastic retainer to define the inboard sides of the seal ring grooves, the space on the inboard sides of the seal ring grooves normally consumed by pinion head material is not necessary. For example, if the end walls 98A-B of the retainer ring 92 are replaced with annular shoulders machined into the pinion head 20 opposite the existing annular shoulders 60A-B, then the the detent pressure chamber 112 requires longitudinal truncation to allow space for the pinion head material separating the seal ring grooves from the detent pressure chamber. Conversely, if the longitudinal dimension of the detent pressure chamber 112 is preserved, then the overall length of the pinion head 20 must be extended to allow space for the pinion head material separating the seal ring grooves from the detent pressure chamber 112.

I claim:

1. In a variable effort automotive power steering gear, the combination comprising:
    an output member having a cylindrical wall with a radial socket therein,
    means defining on said output member a wide annular groove in an outside diameter of said cylindrical wall bounded at opposite ends by respective ones of a pair of annular shoulders,
    an input member having a stem concentric with said cylindrical wall and a longitudinal detent groove in said stem aligned with said radial socket,
    an insert rotatably mounted in said radial socket and including an interlock means thereon and a cylindrical eccentric bore therein the centerline of which is offset from the centerline of said radial socket,
    a detent element slidably mounted in said eccentric bore for seating engagement in said detent groove, and
    an in-situ injection molded plastic retainer on said output member between said annular shoulders engageable with said interlock means to permanently capture the angular position of said insert relative to said output member,
    said in-situ injection molded plastic retainer including a pair of annular end walls facing in spaced relationship respective ones of said annular shoulders and cooperating with said pair of annular shoulders in defining a pair of annular seal ring grooves on said output member, and
    an annular groove in an outside surface of said retainer between said annular seal ring grooves for a detent pressure chamber.

2. The variable effort automotive power steering gear recited in claim 1 wherein said interlock means on said insert includes:
    an exposed cavity for reception of in-situ injection molded plastic when said plastic retainer is in-situ injection molded on said output member.

3. The variable effort automotive power steering gear recited in claim 1 wherein said interlock means on said insert includes:
    means defining on said insert an exposed head having a non-circular shape for reception therearound of in-situ injection molded plastic when said plastic retainer is in-situ injection molded on said output member.

4. The variable effort automotive power steering gear recited in claim 1 and further including:
    means on said output member defining a groove therein in a bottom of said wide annular groove and in a plane parallel to the planes of said annular shoulders, and
    means on said in-situ molded plastic retainer defining an integral flange captured in said groove in said bottom of said wide groove and cooperating therewith in preventing longitudinal bodily movement of said retainer relative to said output member.

5. A pinion head for a variable effort automotive rack and pinion power steering gear comprising:
    means on said pinion head defining a pinion gear aligned on a centerline of said pinion head,
    means on said pinion head defining a cylindrical wall adjacent said pinion gear and aligned on said centerline,
    means on said pinion head defining a wide annular groove in an outside diameter of said cylindrical wall bounded at opposite ends by a pair of annular shoulders,
    means on said pinion head defining a plurality of angularly spaced radial sockets in said cylindrical wall between said annular shoulders and an annular center groove in a bottom of said wide annular groove interconnecting each of said radial socket,
    an input member having a stem concentric with said cylindrical wall and a plurality of longitudinal detent grooves in said stem aligned with respective ones of said radial sockets,
    a plurality of inserts each having an interlock means thereon and a cylindrical eccentric bore therein,
    means rotatably mounting said inserts in respective ones of said radial sockets in said pinion head with the centerlines of said eccentric bores offset from the centerlines of the corresponding ones of said radial sockets,
    a plurality of detent elements slidably mounted in respective ones of said eccentric bores in said inserts, and an in-situ injection molded cylindrical plastic retainer on said pinion head between said annular shoulders engageable with said interlock means to permanently capture the angular positions of each of said plurality of inserts relative to said pinion head, said in-situ injection molded plastic retainer including a pair of annular end walls facing in spaced relationship respective ones of said annular shoulders and cooperating with said pair of annular shoulders in defining a pair of annular seal ring grooves on said pinion head, an integral inner radial flange in and captured by said annular center groove and cooperating therewith in preventing longitudinal bodily movement of said retainer relative to said pinion head, and an annular groove in an outside surface of said retainer between said annular seal ring grooves for a detent pressure chamber.

6. The pinion head recited in claim 5 wherein said interlock means on said plurality of inserts includes:

an exposed cavity on each of said inserts for reception of in-situ injection molded plastic when said plastic retainer is in-situ injection molded on said pinion head.

7. The pinion head recited in claim 5 wherein said interlock means on said plurality of inserts includes:

means defining on each of said inserts an exposed head having a non-circular shape for reception therearound of in-situ injection molded plastic when said plastic retainer is in-situ injection molded on said pinion head.

* * * * *